United States Patent
Aggag et al.

(10) Patent No.: US 9,600,256 B2
(45) Date of Patent: Mar. 21, 2017

(54) INCREMENTALLY COMPILING SOFTWARE ARTIFACTS FROM AN INTERACTIVE DEVELOPMENT ENVIRONMENT

(71) Applicant: Microsoft Technology Licensing, LLC, Redmond, WA (US)

(72) Inventors: Khalid Aggag, Bellevue, WA (US); Suriya Narayanan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 14/058,082

(22) Filed: Oct. 18, 2013

(65) Prior Publication Data

US 2015/0113513 A1   Apr. 23, 2015

(51) Int. Cl.
*G06F 9/45* (2006.01)
*G06F 9/44* (2006.01)
*G06F 9/46* (2006.01)

(52) U.S. Cl.
CPC ..................... *G06F 8/48* (2013.01)

(58) Field of Classification Search
CPC . G06F 8/437; G06F 8/20; G06F 8/443; G06F 9/45516; G06F 8/41; G06F 8/4441; G06F 8/4442; G06F 2212/1028; G06F 2212/601; G06F 8/456; G06F 8/45; G06F 8/445; G06F 2201/865; Y02B 60/1225
See application file for complete search history.

(56) References Cited

U.S. PATENT DOCUMENTS

| | | | |
|---|---|---|---|
| 5,854,932 A | 12/1998 | Mariani et al. | |
| 6,519,767 B1 | 2/2003 | Carter et al. | |
| 7,665,075 B1 * | 2/2010 | Daynes | G06F 9/445 717/148 |
| 8,108,844 B2 * | 1/2012 | Crutchfield | G06F 8/443 717/136 |
| 8,375,368 B2 * | 2/2013 | Tuck | G06F 11/3404 717/130 |
| 8,381,202 B2 * | 2/2013 | Papakipos | G06F 8/45 717/149 |
| 8,418,179 B2 * | 4/2013 | Papakipos | G06F 9/5027 717/140 |

(Continued)

OTHER PUBLICATIONS

Gu et al., Phase-based adaptive recompilation in a JVMPhase-based adaptive recompilation in a JVM, Apr. 2008, 11 pages.*

(Continued)

*Primary Examiner* — Thuy Dao
(74) *Attorney, Agent, or Firm* — Christopher J. Volkmann; Kelly, Holt & Christenson, PLLC

(57) ABSTRACT

An interactive development environment receives developer inputs to develop or customize modeled types. A compilation agent receives a request from the IDE to compile the modeled types that the developer is developing or customizing. The compilation agent accesses a cache of previously compiled types and determines which of the individually loadable types are to be re-compiled based upon the changes made by the developer, and compiles only those identified types. The re-compiled types are also stored in cache.

19 Claims, 11 Drawing Sheets

(56) References Cited

U.S. PATENT DOCUMENTS

| | | | | |
|---|---|---|---|---|
| 8,443,348 B2* | 5/2013 | McGuire | G06F 8/45 | 312/200 |
| 8,448,156 B2* | 5/2013 | Demetriou | G06F 8/45 | 717/136 |
| 2002/0147969 A1* | 10/2002 | Lethin et al. | | 717/138 |
| 2005/0268292 A1* | 12/2005 | Ebbo | G06F 8/41 | 717/145 |
| 2006/0101438 A1* | 5/2006 | Mariani | G06F 9/45516 | 717/148 |
| 2006/0242628 A1* | 10/2006 | Plesko | G06F 8/437 | 717/131 |
| 2007/0240117 A1* | 10/2007 | Wiles | G06F 8/4442 | 717/124 |
| 2007/0294480 A1* | 12/2007 | Moser | | 711/133 |
| 2009/0328012 A1* | 12/2009 | Aharoni | G06F 9/45516 | 717/140 |
| 2010/0313079 A1 | 12/2010 | Beretta et al. | | |
| 2011/0307858 A1 | 12/2011 | Biswas et al. | | |
| 2013/0117733 A1* | 5/2013 | Ahmed et al. | | 717/140 |

OTHER PUBLICATIONS

Li et al., Compiler-based data classification for hybrid caching, Mar. 2010, 7 pages.*

Bagge, Anya Helene, "Facts, Resources, and the IDE/Compiler Mind-Meld", In International Workshop on Academic Software Development Tools and Techniques, Jun. 11, 2013, 12 pages.

Fatin, Pavel, "A New Way to Compile", Published on: Dec. 28, 2012, Available at: http://blog.jetbrains.com/scala/2012/12/28/a-new-way-to-compile/.

"SBT's Incremental Compiler is a Huge Improvement", Published on: Oct. 1, 2013, Available at: https://news.ycombinator.com/item?id=5008317.

"Zinc and Incremental Compilation", Published on: Aug. 13, 2012, Available at: http://typesafe.com/blog/zinc-and-incremental-compilation.

Tromey, Tom, "Incremental Compiler Project", Published on: Jun. 24, 2008, Available at: http://gcc.gnu.org/wiki/IncrementalCompiler.

Newell, Becky, "IL Compiles Explained", Published on: Nov. 7, 2011, Available at: http://blogs.msdn.com/b/axsupport/archive/2011/11/07/il-compiles-explained.aspx.

International Search Report and Written Opinion for International Application No. PCT/US2014/060319, date of mailing: Jan. 20, 2015, date of filing: Oct. 14, 2014, 15 pages.

Wu, Ling, Guangtai Liang, and Qianxiang Wang. "Program Behavior Analysis and Control for Online IDE." Computer Software and Applications Conference Workshops (COMPSACW), 2012 IEEE 36th Annual. IEEE, Jul. 16, 2012, pp. 182-187.

International Preliminary Report on Patentability for International Application No. PCT/US2014/060319, date of mailing: Sep. 22, 2015, date of filing: Oct. 14, 2014, 15 pages.

"Second Written Opinion Issued in PCT Application No. PCT/US2014/060319", Mailed Date: Jul. 3, 2015, 6 Pages.

* cited by examiner

INCREMENTALLY COMPILING SOFTWARE ARTIFACTS FROM AN INTERACTIVE DEVELOPMENT ENVIRONMENT

BACKGROUND

Many software developers use interactive development environments (IDEs) in order to develop software. The developers use an IDE in order to develop models of types within a computer system, and in order to customize those models.

An exemplary integrated development environment is illustratively a development tool or development environment that includes a plurality of different tools so that developers can develop and test the code that needs to be developed and in order to customize a computer system as desired. By way of example, an IDE may include a source code editor, one or more build automation tools and a debugger that allow computer programmers to develop software. Some IDEs illustratively include a compiler, an interpreter, or both. They may include a version control system and various tools to simplify the construction of graphical user interfaces. They can also include a class browser, an object browser, and a class hierarchy diagram for use with object oriented software development. Thus, developers can use IDEs to generate the code and metadata, along with customizations to code and metadata, that may be utilized in developing a system for use in a given organization.

In generating or customizing software using an IDE, the application developer models specific concepts (also referred to as types) within an application and, where necessary, writes code. Large applications, for which developers often use IDEs, can include thousands of different types. Thus, developing and customizing these types is a relatively large task.

By way of example, some computer systems include business systems, such as enterprise resource planning (ERP) systems, customer relations management (CRM) systems, line-of-business (LOB) systems, among others. These types of computer systems often have many thousands of different types that are modeled and customized. By way of example, some such business systems often have thousands of different forms, alone, not to mention many other types.

Business systems are not the only types of computer systems that have a large number of types. For instance, gaming systems, or a wide variety of other types of systems, often also have many thousands of different types that are modeled in the software system.

Such computer systems can be represented by interpreted code or compiled code. As a developer is developing or customizing compiled code, the developer often wishes to work on the development or customizations, and then run the code to make sure that it is working as the developer desires. In a compiled code environment, this has required the compiler to recompile the entire system, in order to run the system with the newly developed or customized code. The reason is that, currently, a compiler is largely just an executable that runs when compilation is needed. When compilation is finished, the compiler loses its memory and any cache it has built. In the development environment, this can be very time consuming and can add time and cost to the development phase of a project, and it can also lead to frustration in the developer experience.

The discussion above is merely provided for general background information and is not intended to be used as an aid in determining the scope of the claimed subject matter.

SUMMARY

An interactive development environment receives developer inputs to develop or customize modeled types. A compilation agent receives a request from the IDE to compile the modeled types that the developer is developing or customizing. The compilation agent hosts a compiler as a long running service that maintains a cache of previously compiled types and determines which of the individually loadable types are to be re-compiled based upon the changes made by the developer, and compiles only those identified types. The re-compiled types are also stored in cache.

The discussion above is merely provided for general background information and is not intended to be used as an aid in determining the scope of the claimed subject matter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
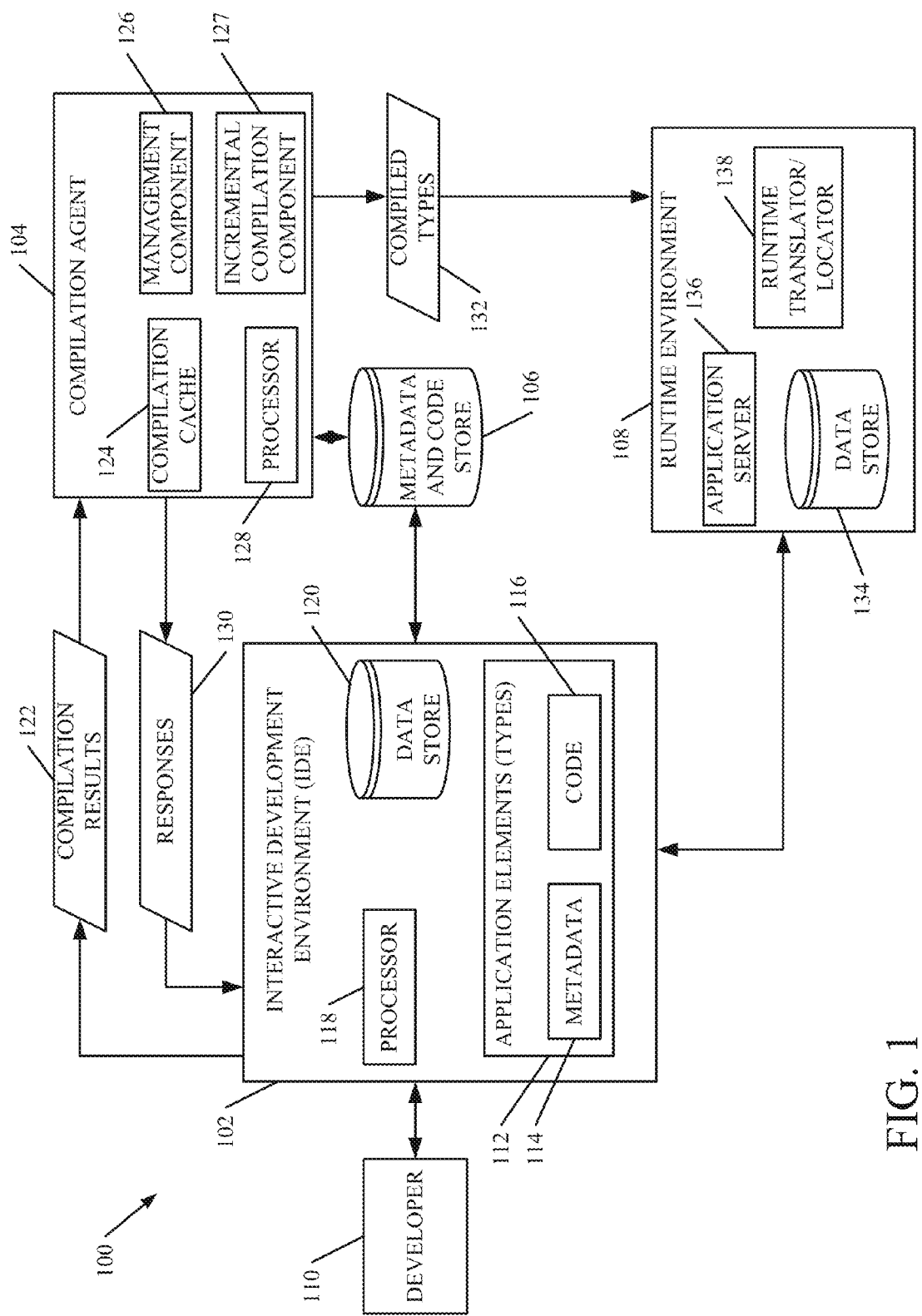
FIG. 1 is a block diagram of one illustrative development architecture.

FIG. 1 shows one illustrative block diagram of a development architecture 100. FIG. 1 shows that development architecture 100 includes interactive development environment (IDE) 102, along with compilation agent 104 and metadata and code store 106. FIG. 1 also shows that IDE 102 and compilation agent 104 can interact with a runtime environment 108 that hosts the computer system developed or customized using IDE 102.

In addition, FIG. 1 shows that a developer 110 illustratively interacts with IDE 102 to perform development or customization of application elements 112 (e.g., types) that are run in the computer system served by runtime environment 108. Each of the application elements illustratively includes metadata 114, and can include code 116 as well. FIG. 1 also shows that IDE 102 illustratively includes a processor 118 and a data store 120.

Compilation agent 104 illustratively performs compilation operations requested in compilation requests 122 sent by IDE 102. Compilation agent 104 illustratively includes cache 124, management component 126 and processor 128. After the compilation operations are performed, agent 104 can illustratively provide responses 130 back to IDE 102. All of these operations are discussed in greater detail below with respect to FIGS. 2 and 3.

Compilation agent 104 also illustratively provides the compiled types 132 to runtime environment 108 where they can be stored in a data store 134 for execution during runtime. Runtime environment 108 illustratively includes application server 136 and runtime translator/locator 138. Runtime translator/locator 138 illustratively locates the types for the application elements that are needed to run the computer system, and loads them on demand. They are illustratively loaded from data store 134 into application server 136 where they can be executed during runtime.

Metadata and code store 106 illustratively stores the metadata and code corresponding to various different types of application elements (e.g., types). It is accessible, for instance, by IDE 102 and compilation agent 104.

Figure 2:
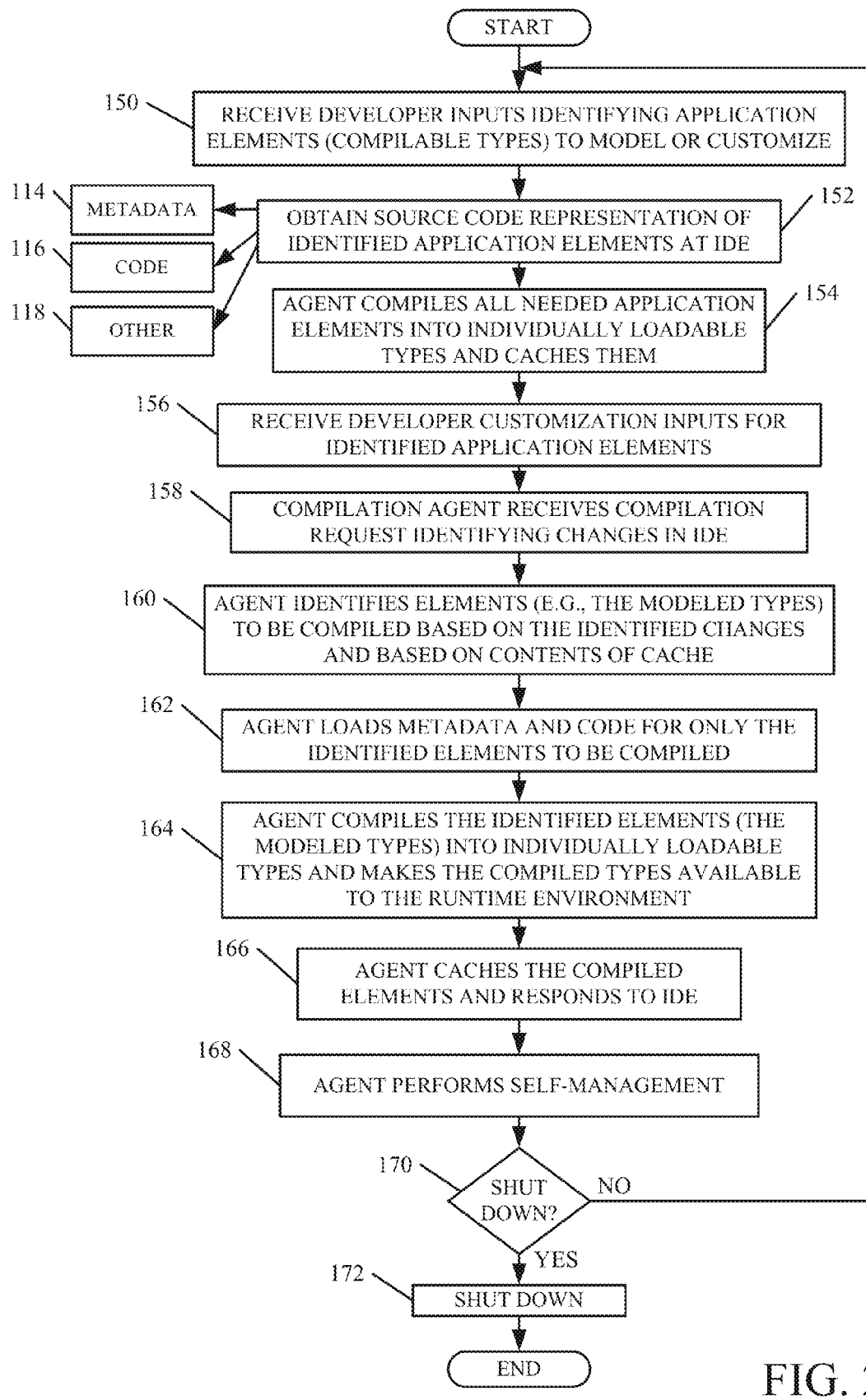
FIG. 2 is a flow diagram illustrating one embodiment of the operation of the architecture shown in FIG. 1 in performing compilation operations during development.

FIG. 2 is a flow diagram illustrating one embodiment of the operation of development architecture 100, shown in FIG. 1, in developing a software system. It will be noted that developer 110 illustratively interacts with user interface displays generated by IDE 102 in order to select application elements for debugging or development in the application server used by runtime environment 108. Developer 110 can interact with IDE 102 either through a separate developer device (such as a personal computer, a tablet, another mobile device, etcetera), or directly. Developer 110 can also interact with IDE 102 over a network. Developer 110 is shown interacting directly with IDE 102 in FIG. 1 for the sake of example only.

IDE 102 first illustratively receives developer inputs identifying application elements (such as compilable types) that the developer wishes to either model or customize. This is indicated by block 150 in FIG. 2. In response, IDE 102 illustratively obtains the source code representation of the identified application elements from metadata and code store 106, or from runtime environment 108. This is indicated by block 152 in FIG. 2. The source code representation can include metadata 114, code 116, or other information 118, as well.

Optionally, compilation agent 104 can also illustratively accesses the metadata and code from store 106 to pre-loaded all needed application elements (e.g., compilable types) that will be loaded in order for developer 110 to run the developed or customized code, after the development or customization operations are performed. Agent 104 illustratively compiles them into individually loadable types and caches them in cache 124. This is indicated by block 154 in FIG. 2. IDE 102 then receives developer customization inputs for the identified application elements, so that the developer actually customizes or develops the compilable types using IDE 102. Receiving the customization inputs and customizing the application elements is indicated by block 156 in FIG. 4.

At some point, after developer 110 has made a desired number of customizations to existing models, or has developed a number of models from scratch, developer 110 may wish to have the code compiled by compilation agent 104. This will enable developer 110 to run the newly developed or customized code to see whether it performs as desired. Recall that compilation agent 104 may have already accessed a number of modeled types from data store 106 and pre-loaded them into cache 124. Also, compilation agent 104 may have already compiled a number of compilable types that have been received from IDE 102, based upon changes that were previously made, or development that was previously performed, by developer 110. Those compiled types may also already be in cache 124. Thus, compilation agent 104 receives a compilation request 122 from IDE 102. In one embodiment, compilation agent 104 receives the compilation parameters in compilation request 122 through a service contract method call. By way of example, the exposed service contract may be one similar to that shown in table 1 below.

TABLE 1

[ServiceContract(ProtectionLevel=ProtectionLevel.None)]
internal interface ICompilationService
{
   /// <summary>
      /// Ensure that the compilation service is up and running
      /// and ready to accept requests
   /// </summary>
   [OperationContract]
   void EnsureServiceRunning( );
   /// <summary>
   /// Represents a compilation requests
   /// </summary>
   /// <param name="parameters">The compilation parameters, which classes to compile, which module, etc.</param>
      /// <param name="stdOutput">The standard output generated from this compilation</param>
      /// <param name="stdError">The standard error generated by this compilation</param>
      /// <returns></returns>
      [OperationContract]
      int Compile(Parameters parameters, out string stdOutput, out string stdError);
}

It will be appreciated that compilation agent 104 can receive compilation request 122 in other ways as well. Having compilation agent 104 receive compilation requests identifying changes or developments made at IDE 102 by developer 110 is indicated by block 158 in FIG. 2.

Compilation agent 104 then accesses cache 124 to identify elements (e.g., the modeled types) that need to be compiled so that the development and customizations made by developer 110 can be run and inspected by developer 110. In one embodiment, compilation agent 104 does this by identifying which particular modeled types have been changed by developer 110, or which have been added, and compiles only those modeled types, and any other modeled types that must be compiled in order for the developed or customized code to be run.

Compilation agent 104 examines cache 124 to determine whether any of the modeled types that are to be compiled have already been compiled and stored in cache 124. If they are, they need not be re-compiled. This is because the modeled types are modeled and compiled as independently loadable assemblies. Thus, only the modeled types that have currently been customized or developed need to be compiled, and any other modeled types need not be re-compiled, so long as they have already been compiled and the compiled version is stored in cache 124. Identifying the elements to be compiled is indicated by block 160 in FIG. 2.

Compilation agent 104 then loads the metadata and code for only the identified elements that need to be compiled from data store 106. This is indicated by block 162 in FIG. 2. By way of example, IDE 102 may store the customized and newly developed types in data store 106 for access by compilation agent 104. When agent 104 identifies that those types must be compiled, it accesses the metadata and code (if any) in data store 106 so that the compilation can be performed.

Once compilation agent 104 has all of the metadata and code needed to perform the compilation, it compiles the identified elements (e.g., the modeled types) into individually loadable types and makes the compiled types 132 available to the runtime environment 108. This is indicated by block 164 in FIG. 2.

Compilation agent 104 then stores the newly compiled elements in cache 124, and sends a response 130 to IDE 102 indicating that the compilation is complete. This is indicated by block 166 in FIG. 2. At that point, runtime environment 108 can run the code that has just been compiled so that developer 110 can determine whether the code performs as desired. In doing so, runtime translator/locator 138 can identify the compiled types 132 and application server 136 can load and run them.

Throughout the entire process, management component 126 illustratively performs self-management of agent 104. This is described in greater detail below with respect to FIG. 3. Briefly, however, management component 126 illustratively monitors the memory footprint being used by compilation 104. If it reaches a threshold level, management component 126 can invalidate cache 124, for instance, to release a large portion of the memory. Similarly, if compilation agent 104 is idle for a predetermined amount of time, or if no IDE instances 102 are currently instantiated, then agent 104 can shut itself down. Performing self-management is indicated by block 168 in FIG. 2, and determining whether to shut itself down is indicated by block 170.

If, at block 170, it is determined that management component 126 should shut down agent 104, it is shut down. This is indicated by block 172 in FIG. 2.

Figure 3:
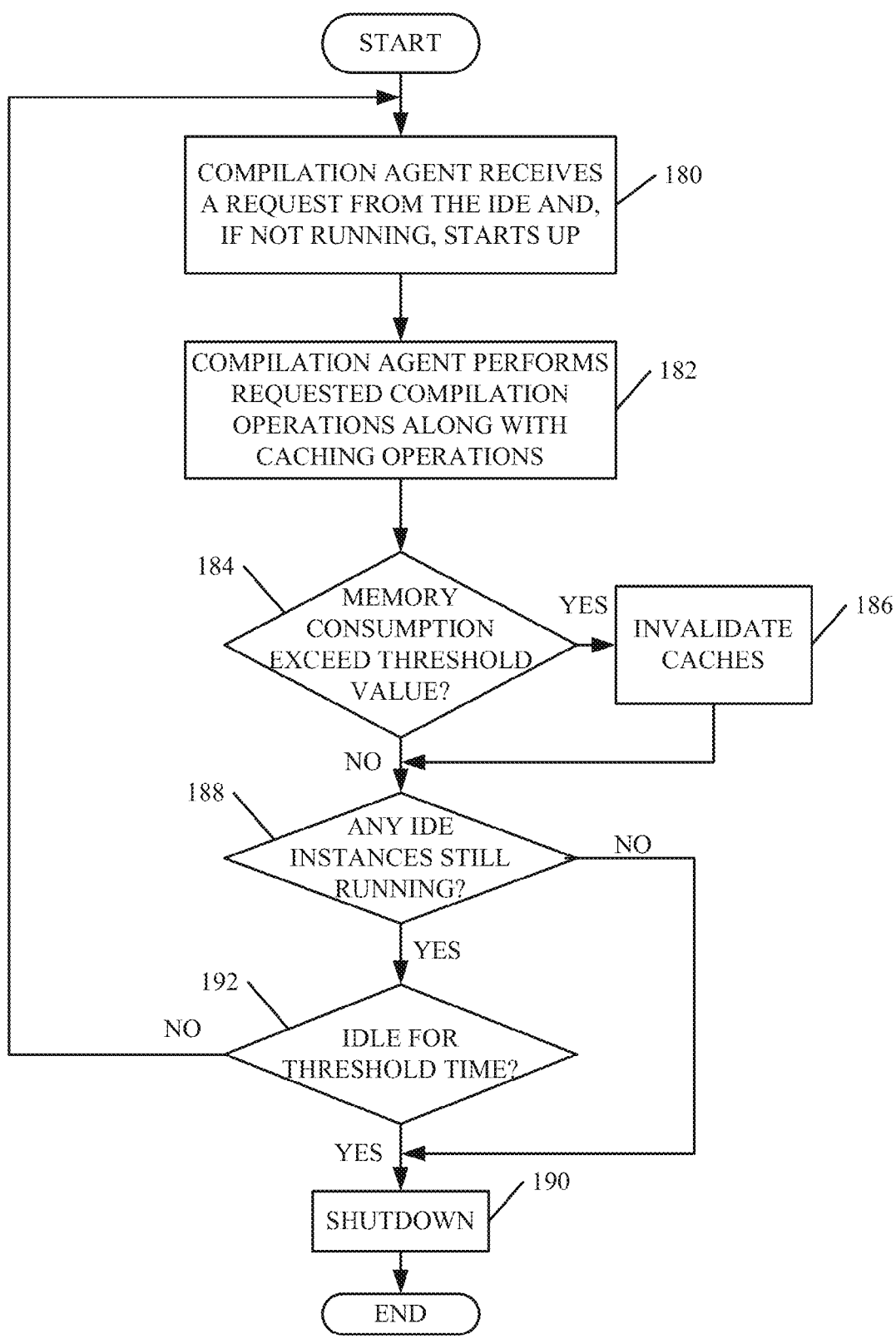
FIG. 3 is a flow diagram illustrating one embodiment of a management component, for the compilation agent shown in FIG. 1, in managing the operation of the compilation agent.

FIG. 3 is a flow diagram illustrating one embodiment of the operation of management component 126 in more detail. It should be noted that when IDE 102 first provides a compilation request 122 to agent 104, agent 104 may be running at the time, or it may not be. If it is not, management component 126 automatically detects that a compilation request 122 has been received and launches compilation agent 104. Receiving a request from the IDE 102 and starting up agent 104, if it is not already started, is indicated by block 180 in FIG. 3.

As discussed above with respect to FIG. 2, compilation agent 104 then performs the requested compilation operations along with the caching operations. That is, compilation agent 104 compiles all of the needed compilable types (after searching cache 124 to determine which ones need to be compiled or re-compiled), and stores the newly compiled types in cache 124. This is indicated by block 182 in FIG. 3.

Management component 126 intermittently queries the operating system in which it is running (or with which it is running) to determine whether the memory consumption of compilation agent 104 exceeds a given threshold value. This is indicated by block 184 in FIG. 3. If so, management component 126 invalidates, or frees up, cache 124. That is, it starts the caching operations (caching compiled types) over again. This is indicated by block 186. Of course, management component 126 can perform other operations to reduce the memory footprint of compilation agent 104 as well, and invalidating the cache is only one example.

If, at block 184, it is determined that the memory consumption does not exceed the threshold value, or after the cache is invalidated at block 186, management component 126 determines whether there are any instances of IDE 102 still running. This is indicated by block 188 in FIG. 3. A single instance of compilation agent 104 can, for example, serve multiple instances of IDE 102. If no instances of IDE 102 are running, then there is no need for compilation agent 104 to be running, and it shuts itself down as indicated by block 190.

However, if at block 188 it is determined that there are instances of IDE 102 still running, then management component 126 determines whether compilation agent 104 has been idle for a threshold amount of time. This is indicated by block 192 in FIG. 3. By way of example, it may be that developer 110 is still authoring code but is not debugging the code yet. It may also be that developer 110 has taken a break, or is simply not in a development phase where he or she is wishing to have code compiled. In any case, if compilation agent 104 has been idle for a threshold amount of time at block 192, management component 126 shuts it down as indicated by block 190. However, if, at block 192, it is determined that compilation agent 104 has not been idle for the threshold amount of time, then processing simply reverts to block 180 where agent 104 waits for further compilation requests 122 from IDE 102.

It can thus be seen that compilation agent 104, whenever it receives a compilation request 122, compiles or re-compiles only those compilable types that need to be, based upon the changes made by developer 110, and based upon which types are already compiled and stored in cache 124. This significantly reduces the compile time during which developer 110 has to wait to see whether the code runs properly. This enhances the developer experience, and it can reduce time and effort required in developing, customizing, or debugging code.

It should also be noted that the above discussion has shown a number of data stores, including data store 120, data store 106 and data store 134. While these are shown as three independent data stores, they could also be formed within a single data store. In addition, the data in those data stores can be stored in multiple additional data stores as well. Also, the data stores can be local to the environments or agents or components that access them, or they can be remote therefrom and accessible by those environment, components or agents. Similarly, some can be local while others are remote.

Processors 118 and 128, and server 136 illustratively include computer processors with associated memory and timing circuitry (not separately shown). They are a functional part of the agent or environment to which they belong, and are illustratively activated by, and facilitate the functionality of, other items in that environment or agent.

It will also be noted that FIG. 1 shows compilation agent 104 as being separate from IDE 102. However, it will be appreciated that compilation agent 104 can be part of IDE 102 as well. Also, FIG. 1 shows a variety of different blocks, with functionality associated with each block. It will be noted that the blocks can be consolidated so that more functionality is performed by each block, or they can be divided so that the functionality is further distributed.

Also, the user interface displays that developer 110 interacts with to manipulate and control IDE 102 illustratively have user actuatable input mechanisms that can take a wide variety of different forms, such as icons, text boxes, check boxes, tiles, drop down menus, etc. They can illustratively be actuated using a point and click device (such as a trackball or mouse), buttons, joysticks, thumbpads, thumb switches, virtual or hardware keyboards or keypads. Also, where the user interface displays are displayed on a touch sensitive screen, the user input mechanisms can be activated by touch gestures, with a users finger, a stylus, etc. Where the device displaying the displays has speech recognition components, then the user input mechanisms can be actuated using speech commands.

Figure 4A:
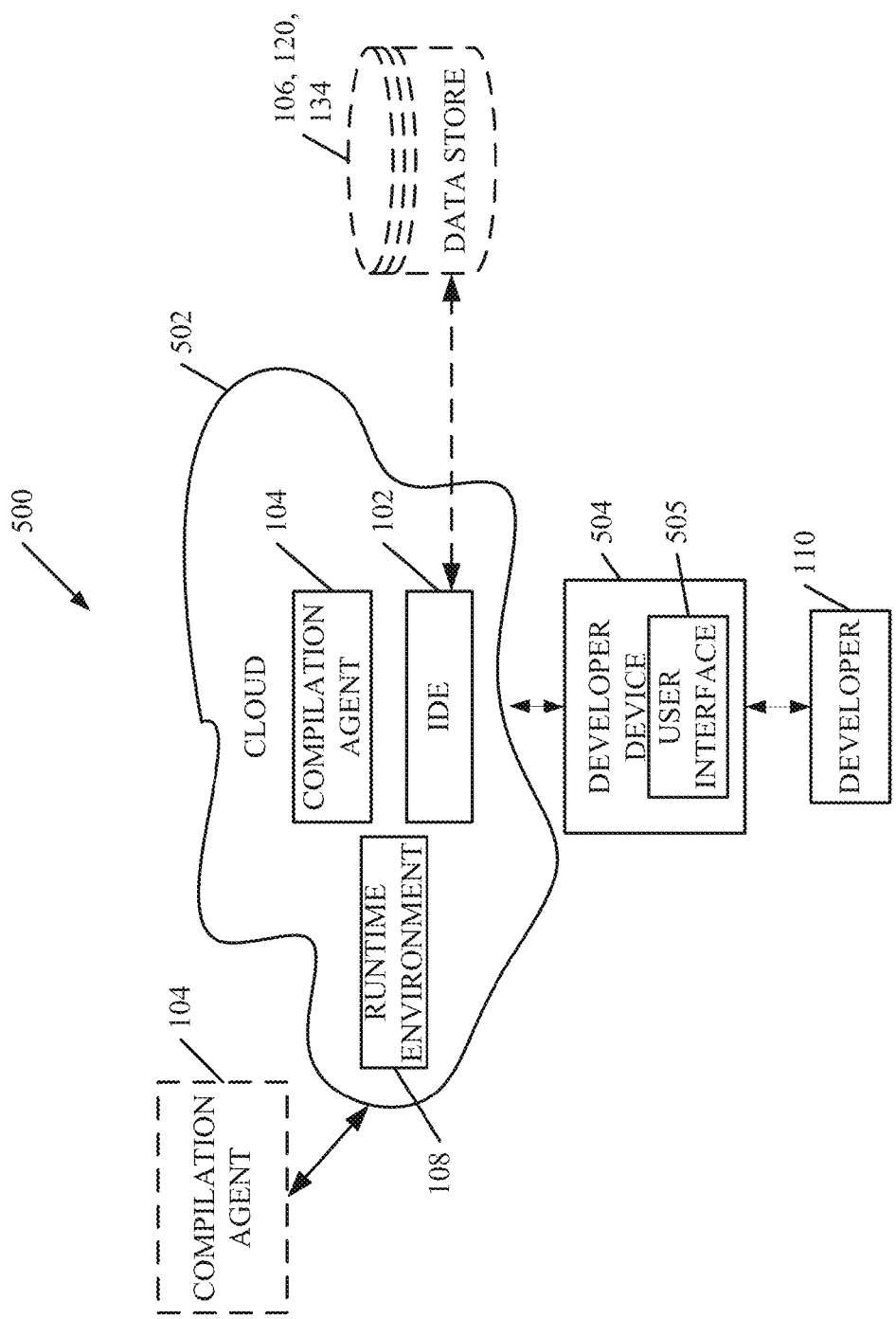
FIGS. 4A and 4B show various embodiments of the architecture shown in FIG. 1, deployed in cloud computing architectures.

FIG. 4A is a block diagram of architecture 100, shown in FIG. 1, except that its elements are disposed in a cloud computing architecture 500. FIG. 4A shows a number of alternative arrangements. For instance, compilation agent 104 is shown both in cloud 502 and outside of it. This is meant to illustrate that agent 502 can be located in a wide variety of different locations, as can the other items in architecture 100. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4A, some items are similar to those shown in FIG. 1 and they are similarly numbered. FIG. 4A specifically shows that IDE 102, compilation agent 104 and runtime environment 108 can all be located in cloud 502 (which can be public, private, or a combination where portions are public while others are private). Therefore, developer 110 uses a user device 504 with user interface displays 505 to access those systems through cloud 502.

FIG. 4A also depicts another, alternative, embodiment of a cloud architecture. FIG. 4A shows that it is also contemplated that some elements of architecture 100 are disposed in cloud 502 while others are not. By way of example, data stores 106, 120, 134 can be disposed outside of cloud 502, and accessed through cloud 502. In another embodiment, compilation agent 104 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

Figure 4B:
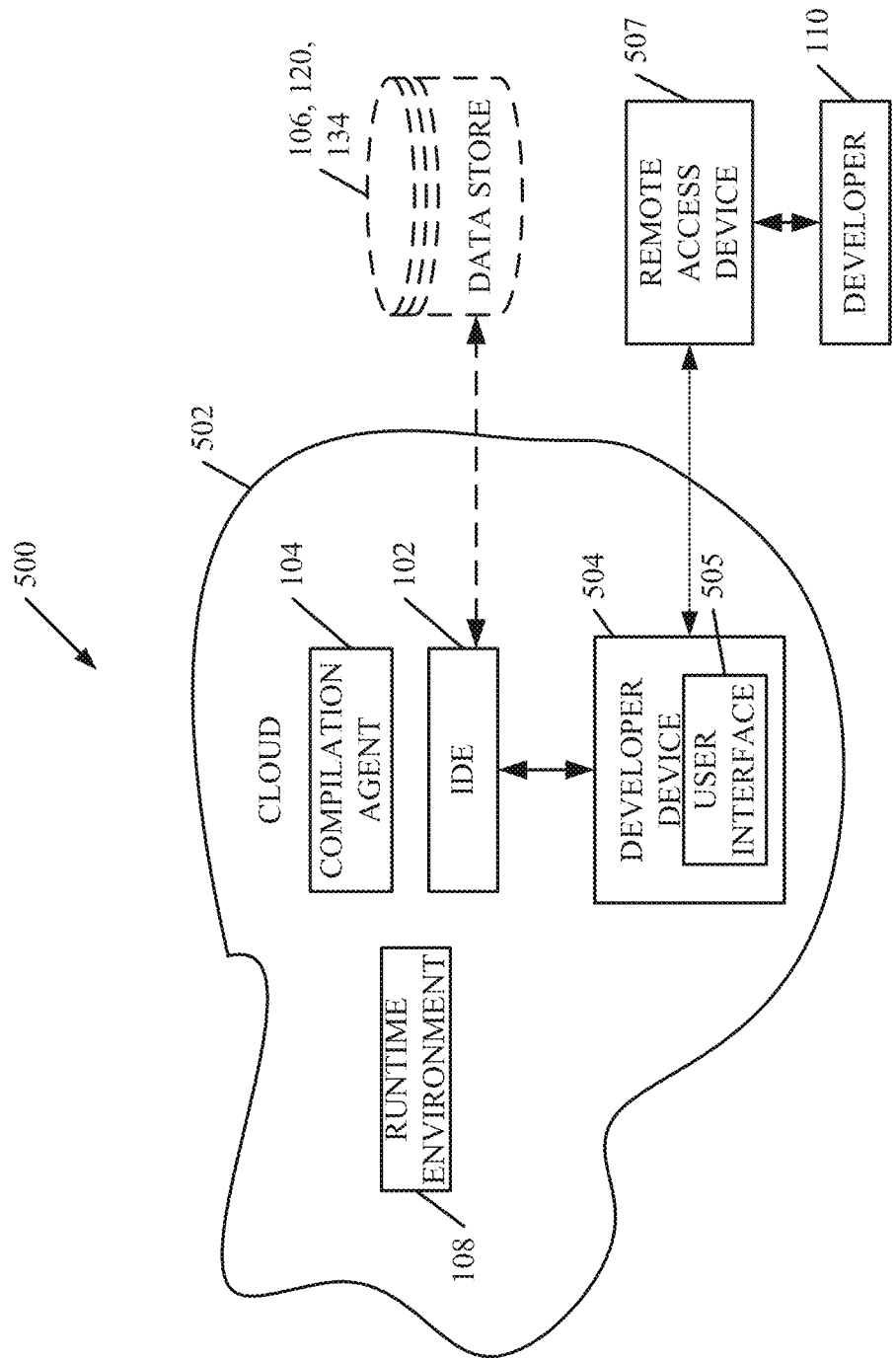

FIG. 4B shows a block diagram of another cloud-based architecture. FIG. 4B is similar to FIG. 4A except that developer 110 accesses developer device 504 and IDE 102 using a remote access device 507. All the various configurations represented in FIGS. 4A and 4B are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
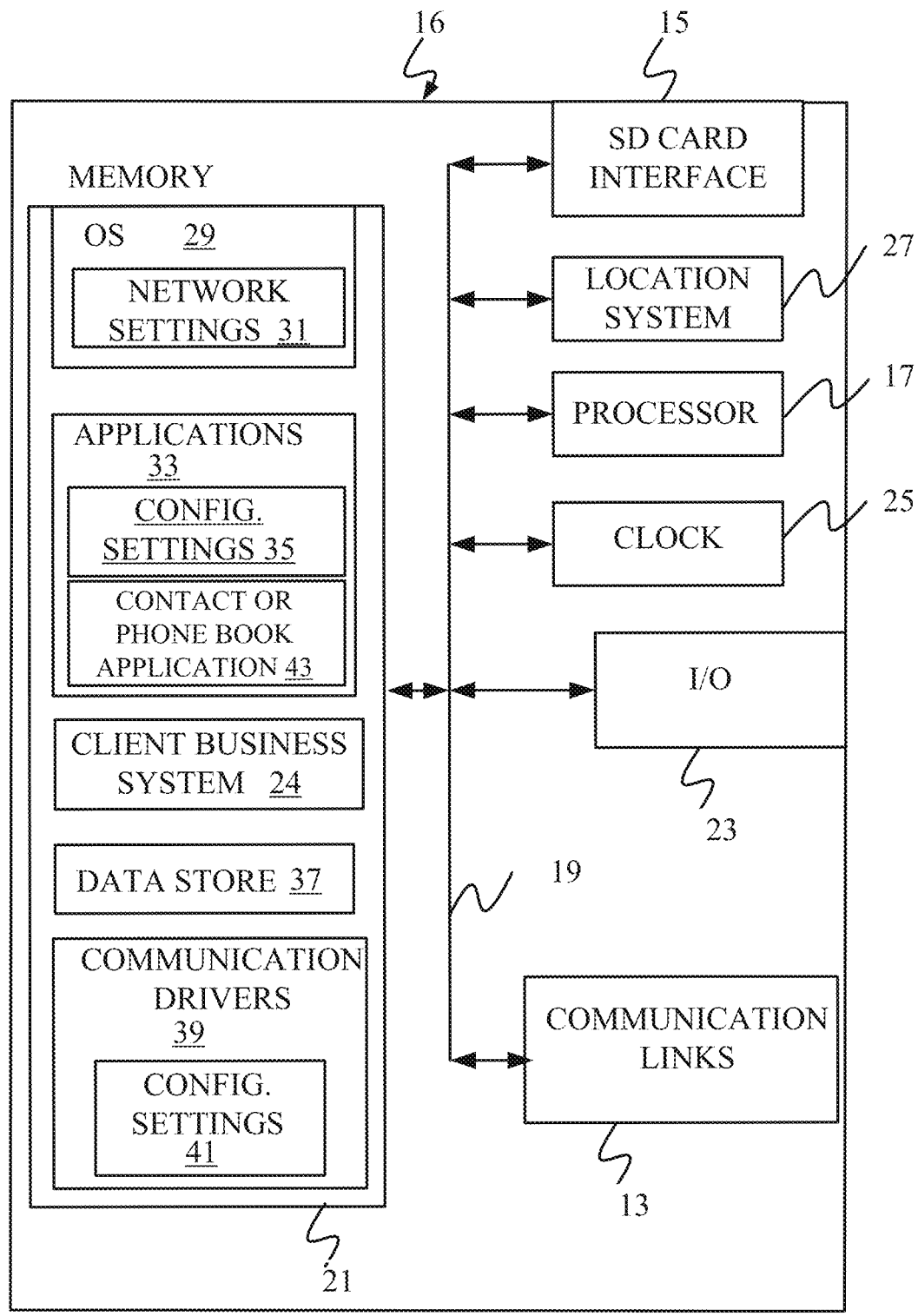
FIGS. 5-9 show various embodiments of mobile devices.

FIG. 5 is a simplified block diagram of one illustrative embodiment of a handheld or mobile computing device that can be used as a user's or client's hand held device 16, in which architecture 100 (or parts of it) can be deployed. FIGS. 6-9 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 118 or 128 or server 136 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
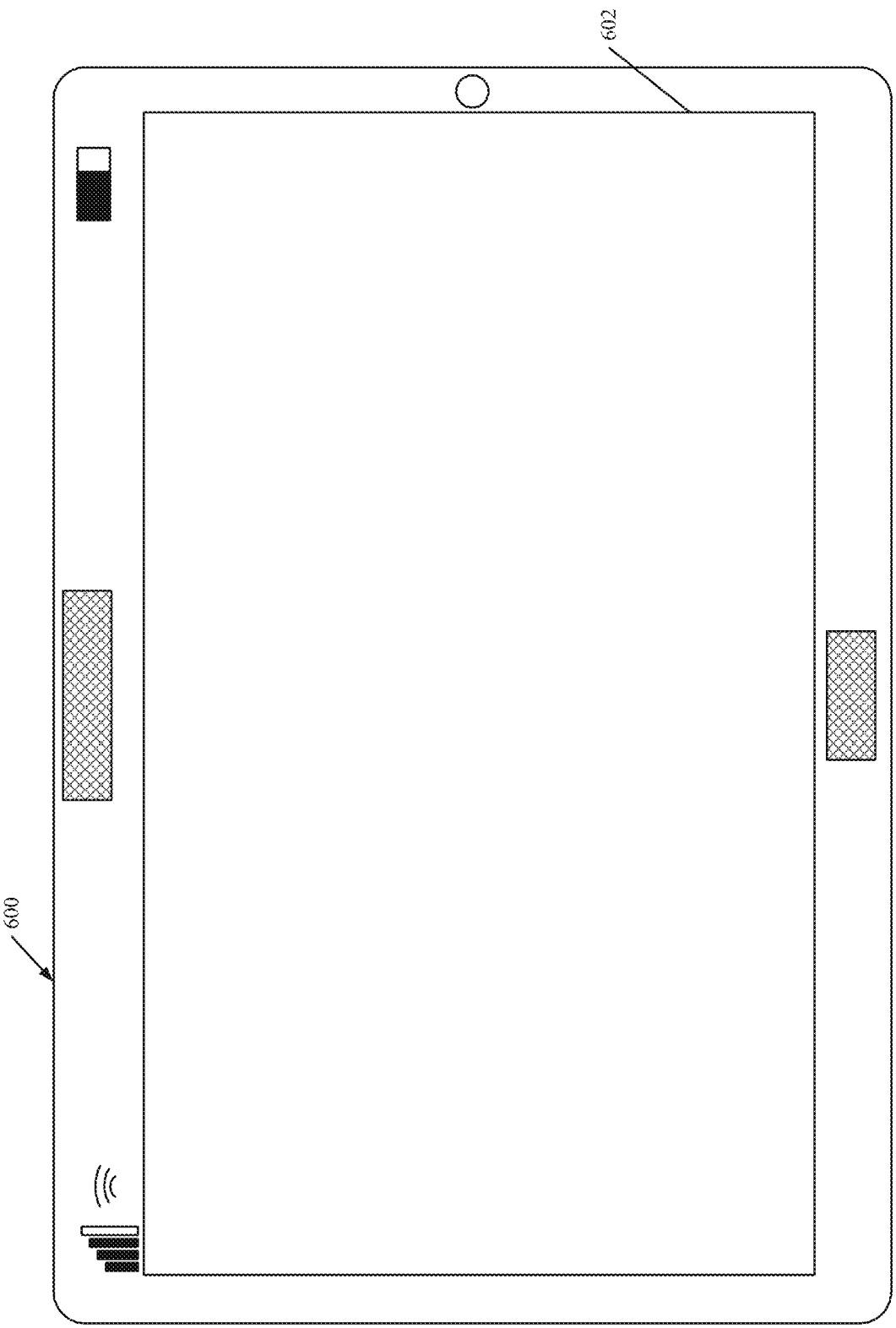

FIG. 6 shows one embodiment in which device 16 is a tablet computer 600. In FIG. 6, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
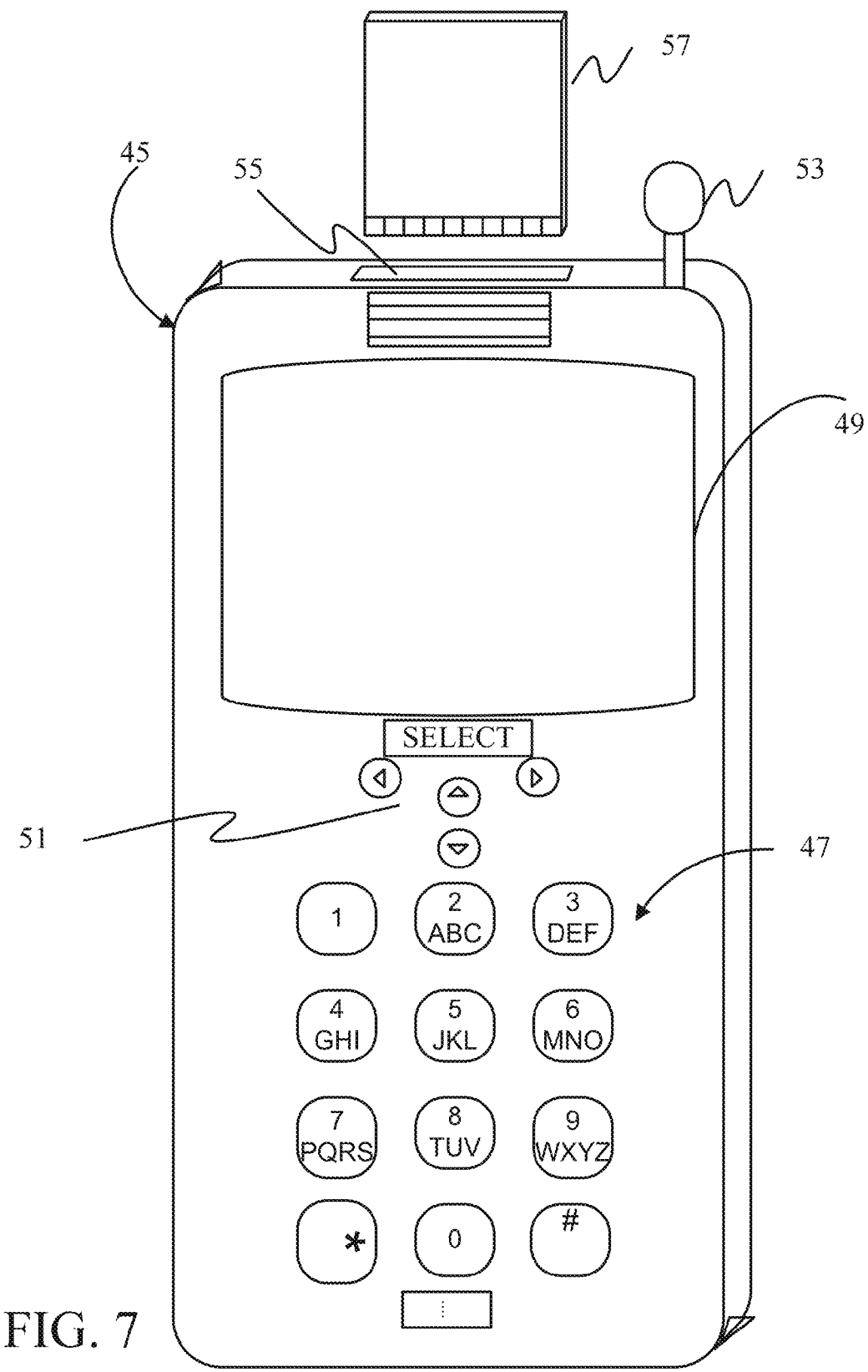
Figure 8:
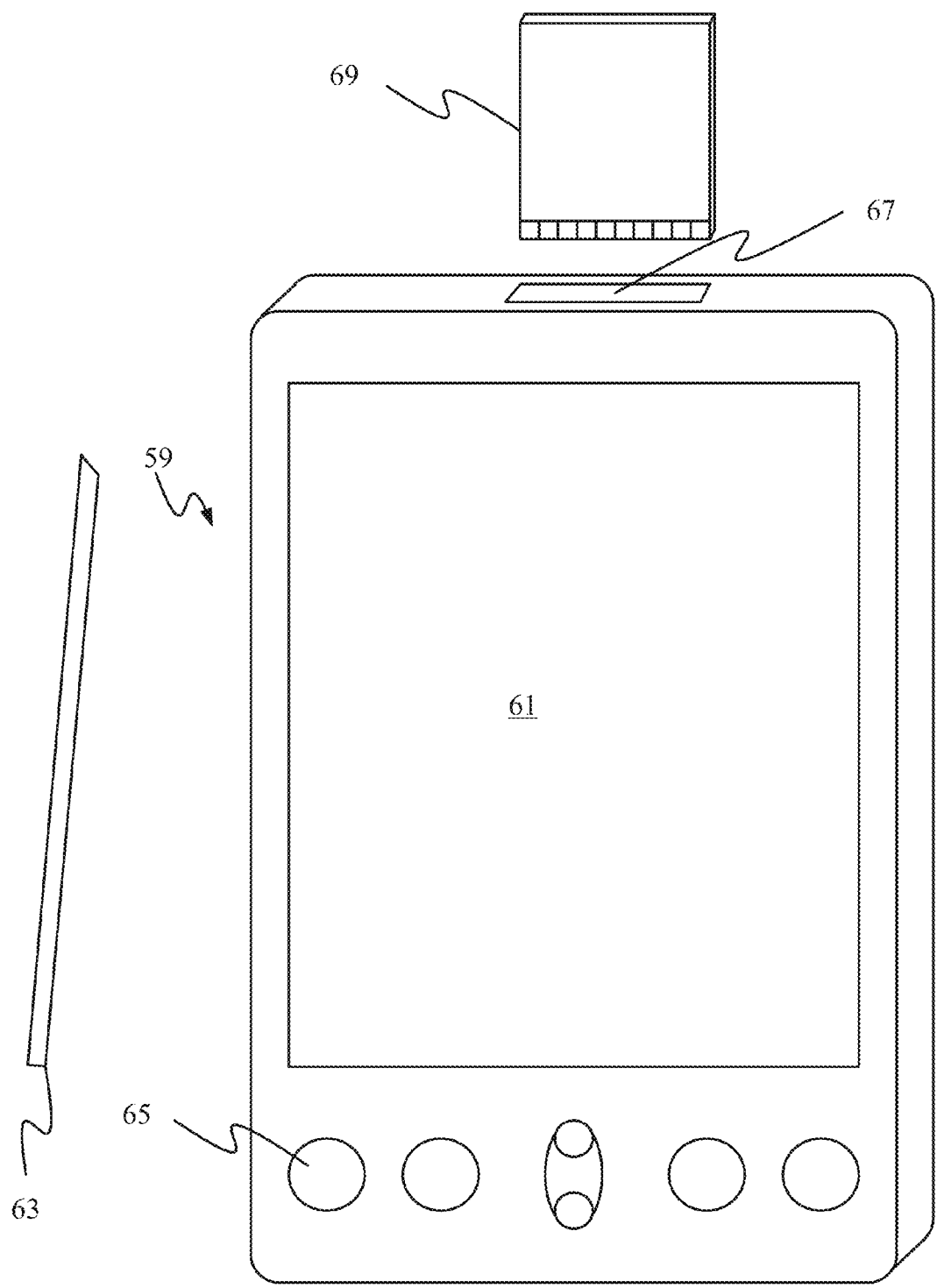

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
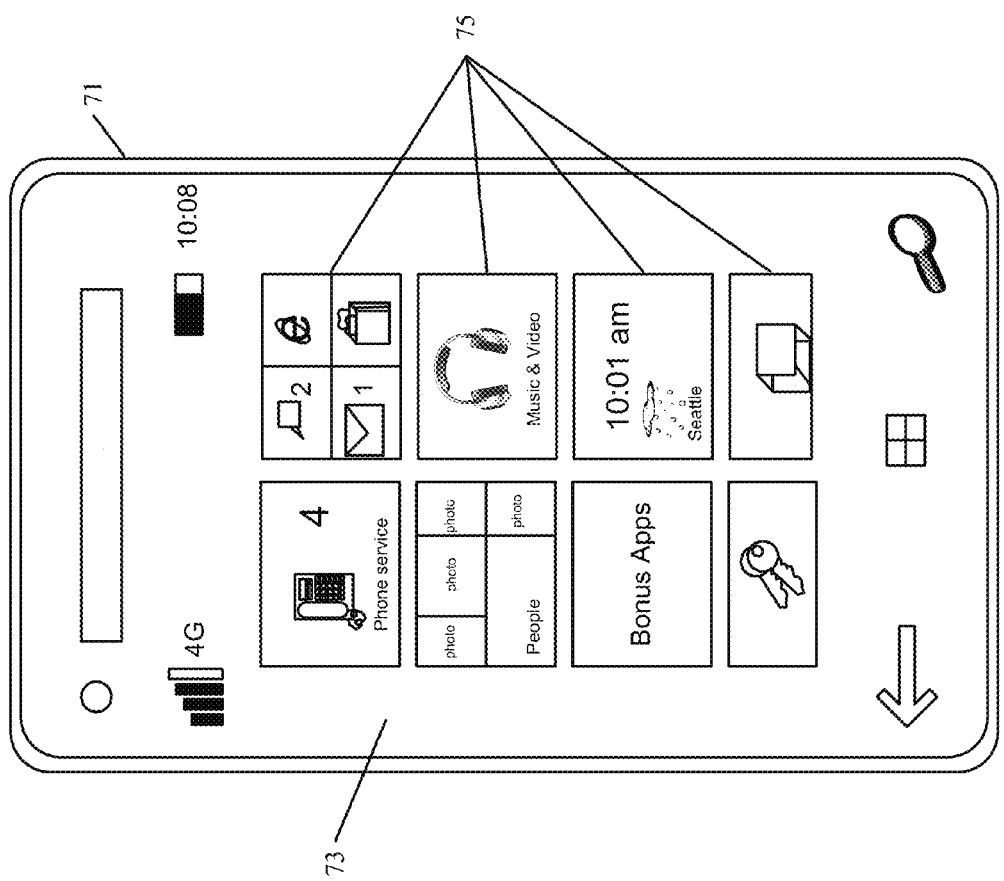

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
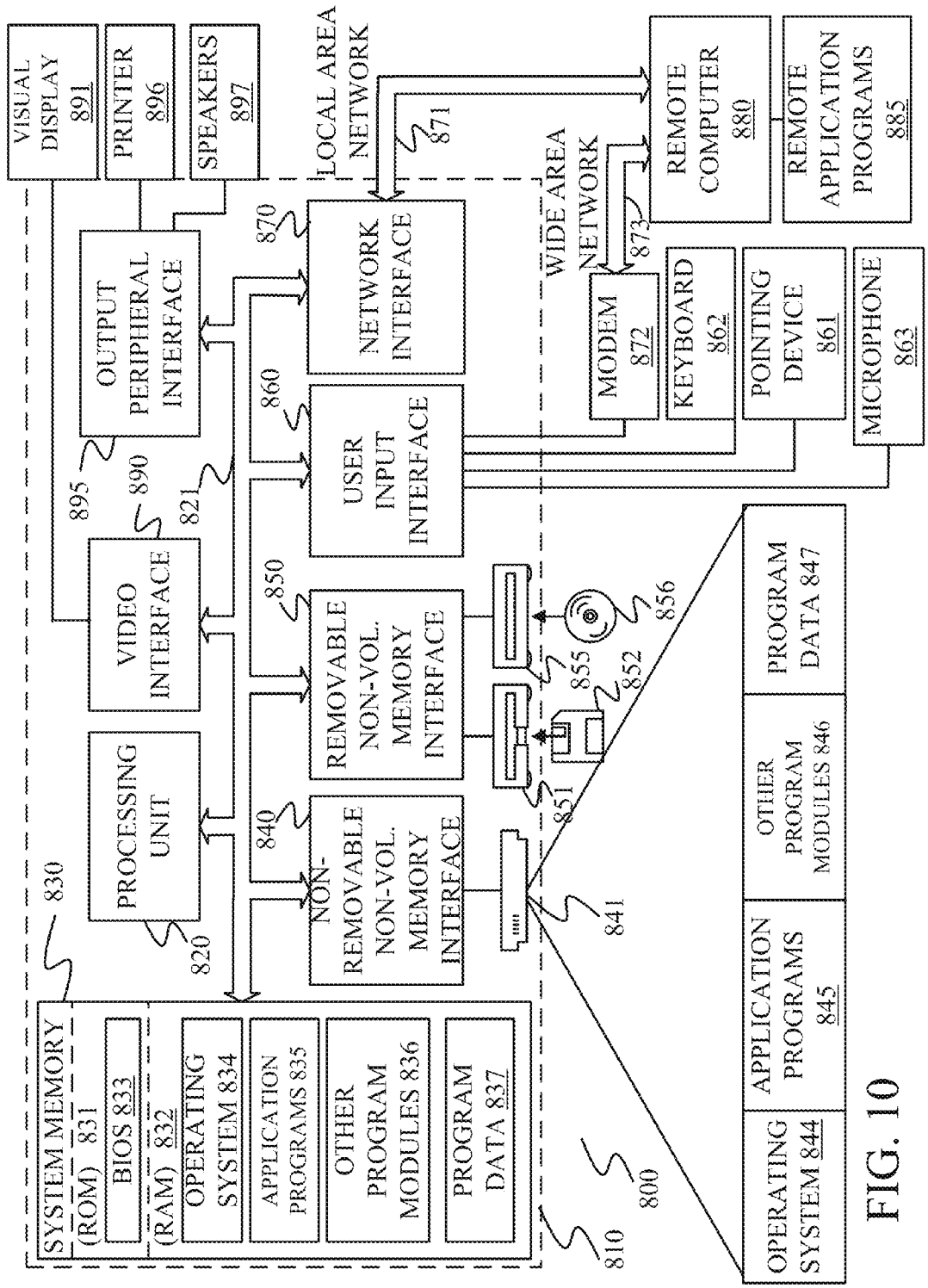
FIG. 10 is a block diagram of one illustrative computing environment.

FIG. 10 is one embodiment of a computing environment in which architecture 100, or parts of it, (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processor 118 or 128 or server 136), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of developing a computer system that models types, the method comprising:
    receiving, by a compilation agent, a request to have a type compiled;
    identifying, by the compilation agent, the type to compile, as a subset of the types modeled in the computer system, based on a change to the computer system made in a development environment and based on types already compiled and stored in a compilation cache;
    compiling, by the compilation agent, the identified type to obtain a previously compiled type;
    storing the previously compiled type in the compilation cache accessible to a runtime environment;
    intermittently determining whether a memory usage of the compilation cache meets a threshold value and, if so, invalidating at least a portion of the compilation cache; and
    intermittently determining whether the compilation agent has been idle for a threshold time period and, if so, shutting down the compilation agent.

2. The computer-implemented method of claim 1, wherein identifying the type to compile comprises:
    determining that the identified type has not already been compiled and stored in the compilation cache; and selecting the type for compilation based on the determination.

3. The computer-implemented method of claim 1 and further comprising:
sending the previously compiled type to the runtime environment to be run.

4. The computer-implemented method of claim 3 and further comprising:
repeating the steps of receiving a request, identifying a type, compiling the identified type, and storing the previously compiled type.

5. The computer-implemented method of claim 1, wherein the steps of receiving a compilation request, identifying the type, and compiling are performed by a compilation agent, and further comprising:
intermittently determining whether any instances of the development environment are running and, if not, shutting down the compilation agent.

6. The computer-implemented method of claim 1, and further comprising:
receiving a development input at the development environment developing the identified type.

7. The computer-implemented method of claim 6 wherein receiving the development input comprises:
creating a model of the identified type.

8. The computer-implemented method of claim 6 wherein receiving the development input comprises:
customizing a model of the identified type.

9. A compilation system for compiling types modeled in a computer system, comprising:
a compilation cache having a memory storing previously-compiled types;
an incremental compilation component configured to:
receive a compilation request from a development environment;
identify a type to be compiled based on a change made to the computer system in the development environment and by searching the compilation cache to identify whether the type to be compiled is stored as a previously compiled type; and
compile the identified type to obtain a previously compiled type and store the obtained previously compiled type in the compilation cache making it accessible to a runtime environment; and
a management component configured to:
manage memory usage and operation of the compilation system;
intermittently determine whether a memory usage from the compilation system meets a threshold level and, if so, invalidate at least a part of the compilation cache; and
intermittently determine whether the compilation system has been idle for a predetermined threshold time and, if so, shut down the compilation system.

10. The compilation system of claim 9, wherein the development environment is configured to receive a development input that develops the type and to create a model of the developed type.

11. The compilation system of claim 9, wherein the system is configured to send the recently compiled type to a runtime environment to be run.

12. The compilation system of claim 9, wherein the management system is configured to intermittently determine whether any development environment instances are running and, if not, shuts down the compilation system.

13. The compilation system of claim 9, wherein the compilation cache, the incremental compilation component and the computer processor are part of an integrated development environment (IDE).

14. The compilation system of claim 9, wherein the incremental compilation component is configured to identify the type to be compiled by determining that the identified type has not already been compiled and stored in the compilation cache and selecting the type for compilation based on the determination.

15. A computer-implemented method of developing a computer system that models a type, the method comprising:
receiving a request to have the type compiled;
determining that the type has been previously compiled and stored in a compilation cache as a previously compiled type;
determining that a change in a development environment has been made to the type since the previously compilation;
based on the determination that the change has been made to the type, selecting the type for compilation;
based on selecting the type for compilation, re-compiling the type to obtain a re-compiled type; and
updating the compilation cache based on the re-compiled type, wherein the compilation cache is accessible to a runtime environment;
wherein the steps of receiving a request, selecting the type, and re-compiling the type are performed by a compilation agent, the method comprising:
intermittently determining whether the compilation agent has been idle for a threshold time period and, if so, shutting down the compilation agent.

16. The computer-implemented method of claim 15 wherein the steps of receiving a request, identifying the type, and compiling are performed by a compilation agent, and further comprising:
intermittently determining whether any instances of the development environment are running and, if not, shutting down the compilation agent; and
intermittently determining whether the compilation agent has been idle for a threshold time period and, if so, shutting down the compilation agent.

17. The computer-implemented method of claim 15, and further comprising:
receiving an indication of a development input at the development environment; and
based on the indication of the development input, performing the change to develop the type in the development environment.

18. The computer-implemented method of claim 15, and further comprising:
repeating the steps of receiving a request, identifying the type, compiling the identified type, and storing the previously compiled type.

19. The computer-implemented method of claim 15, and further comprising:
intermittently determining whether a memory usage of the compilation cache meets a threshold value and, if so, invalidating at least a portion of the compilation cache.

* * * * *